(12) United States Patent
Wilson et al.

(10) Patent No.: US 8,389,913 B2
(45) Date of Patent: Mar. 5, 2013

(54) INDUCTION HEATING APPARATUS WITH SUSPENDED INDUCTION PLATE

(75) Inventors: Scott Wilson, Chicago, IL (US); Jon Godston, Chicago, IL (US); Stephen Christopher, Chicago, IL (US); Dennis M. Puhalla, Chicago, IL (US); Dustin Brown, Chicago, IL (US)

(73) Assignee: Scott Wilson Design Limited, Chicago, IL (US)

( * ) Notice: Subject to any disclaimer, the term of this patent is extended or adjusted under 35 U.S.C. 154(b) by 471 days.

(21) Appl. No.: 12/683,860

(22) Filed: Jan. 7, 2010

(65) Prior Publication Data

US 2010/0170892 A1    Jul. 8, 2010

Related U.S. Application Data

(60) Provisional application No. 61/142,932, filed on Jan. 7, 2009.

(51) Int. Cl.
*H05B 6/12* (2006.01)
(52) U.S. Cl. .................... 219/622; 219/621
(58) Field of Classification Search ............... 219/616, 219/618, 621, 629, 622
See application file for complete search history.

(56) References Cited

U.S. PATENT DOCUMENTS

| 457,561 A | 8/1891 | Kennedy |
| 932,242 A | 8/1909 | Berry |
| 3,928,744 A * | 12/1975 | Hibino et al. ............... 219/624 |
| 5,855,160 A | 1/1999 | Shen ............................ 99/279 |
| 2010/0000980 A1 | 1/2010 | Popescu .................... 219/201 |

FOREIGN PATENT DOCUMENTS

| JP | 09-192018 A | 7/1997 |
| JP | 9201281(A) | 8/1997 |
| JP | 2000-311773 A | 11/2000 |
| JP | 2002272619(A) | 9/2002 |
| JP | 2003272814(A) | 9/2003 |
| JP | 3503323 * | 3/2004 |
| JP | 2005-296161 A | 10/2005 |

OTHER PUBLICATIONS

International Search Report for PCT/US2010/02355, dated Aug. 5, 2010.

* cited by examiner

*Primary Examiner* — N Drew Richards
*Assistant Examiner* — Grant Withers
(74) *Attorney, Agent, or Firm* — Neal, Gerber & Eisenberg LLP

(57) ABSTRACT

An apparatus and method for induction heating of a liquid. The apparatus includes a vessel having a volume for receiving a liquid, an induction plate and an induction base. The induction plate is positioned proximate to an induction base and suspended within the vessel, so that it is completely surrounded by the liquid to be heated. The apparatus may also include a filter column positioned within the vessel and for receiving an infuser.

21 Claims, 3 Drawing Sheets

INDUCTION HEATING APPARATUS WITH SUSPENDED INDUCTION PLATE

CROSS-REFERENCE TO RELATED APPLICATIONS

This application claims the benefit of Provisional Patent Application Ser. No. 61/142,932 file Jan. 7, 2009.

TECHNICAL FIELD OF THE INVENTION

The present invention relates to an induction heating apparatus, and a method for induction heating of a liquid, and more specifically to a kettle or other liquid-receiving vessel having an internal suspended induction plate for heating the liquid within the vessel.

BACKGROUND OF THE INVENTION

Induction technology for use in cookware and in stove or range tops is well-known. Induction heating and cooking does not involve generating heat, which is then transferred to the cooking or heating vessel, as in standard cooking. Rather, the cooking vessel itself is the original generator of the heat used in cooking or heating. Specifically, activation of an induction heating device creates a magnetic field which in turn creates eddy currents in a receiving induction plate, thereby heating it. Induction uses upwards of 90% of the energy produced. It is also more energy efficient than standard resistance heating because it recognizes the footprint of the induction plate or disc and only heats that area. Finally, induction heating cooks nearly 50% faster than gas or electric.

Heating liquid, such as water, for brewing tea or coffee is well known. Typically a kettle is filled with water and placed on a heat source, generally a gas or electric stove or range top. The water along with the kettle is heated to the boiling point or desired temperature, and then the liquid is poured, for example, into a teapot for brewing tea.

Heating water to brew tea or coffee in the above manner is not always energy efficient or safe, because not only does the water and the kettle heat up, but the stove or range top heats up as well. Induction heating, on the other hand, is known to be more energy efficient than standard resistance heating. The present invention solves the problems encountered through the standard heating of liquid by providing a vessel with a suspended induction heating plate, which is contained within the vessel and surrounded by the liquid. The induction heating plate is activated by an induction base, which can be compact and portable. Thus, the present invention permits the user to heat water faster and with more energy efficiency than a conventional stove kettle. In addition, the heat induction plate of the present invention is completely contained within the vessel providing for a safer apparatus. The present invention also provides ease of assembly, use and cleaning because of the removable subassembly including a filter column to which the induction heating plate may optionally be attached.

SUMMARY OF THE INVENTION

An apparatus and method is provided for induction heating of a liquid. An induction heating apparatus comprises a non-ferrous vessel having a volume, an induction plate seated within the volume; and an induction base. The induction plate is suspended within the volume. The apparatus may also include a filter column centrally positioned within the volume.

In another embodiment of the present invention, an induction heated kettle for heating a liquid is provided. The kettle comprises a non-ferrous vessel having a volume for receiving a liquid, an induction plate seated within the volume, and an induction base. The induction plate is suspended within the volume. The kettle may also include a filter column centrally positioned within the volume.

According to another embodiment of the invention, a method for induction heating of a liquid is provided. The method includes the steps of providing an induction heating apparatus, the apparatus comprising a non-ferrous vessel having a volume, an induction plate seated within the volume, and an induction base. The method further includes applying energy to the compact induction base, generating heat through the induction plate, and heating the liquid to the desired temperature.

Other embodiments, systems, methods, features, and advantages of the present invention will be, or will become, apparent to one having ordinary skill in the art upon examination of the following drawings and detailed description. It is intended that all such additional systems, method, features, and advantages be within the scope of the present invention, and can be protected by the accompanying claims.

BRIEF DESCRIPTION OF THE DRAWINGS

The invention may be better understood with reference to the following drawings. The components in the drawings are not necessarily to scale, emphasis instead being placed upon illustrating the principles of the invention. In the drawings, like reference numbers designate corresponding parts throughout.

DETAILED DESCRIPTION OF THE INVENTION

The following descriptions of detailed embodiments are for exemplifying the principles and advantages of the inventions. They are not to be taken in any way as limitations on the scope of the inventions.

In one application of an embodiment in accordance with the present invention, an induction heating apparatus is provide for heating of a liquid, the apparatus including a vessel 12 having a volume, an induction plate 20 seated within the volume, and an induction base 24.

Figure 1:
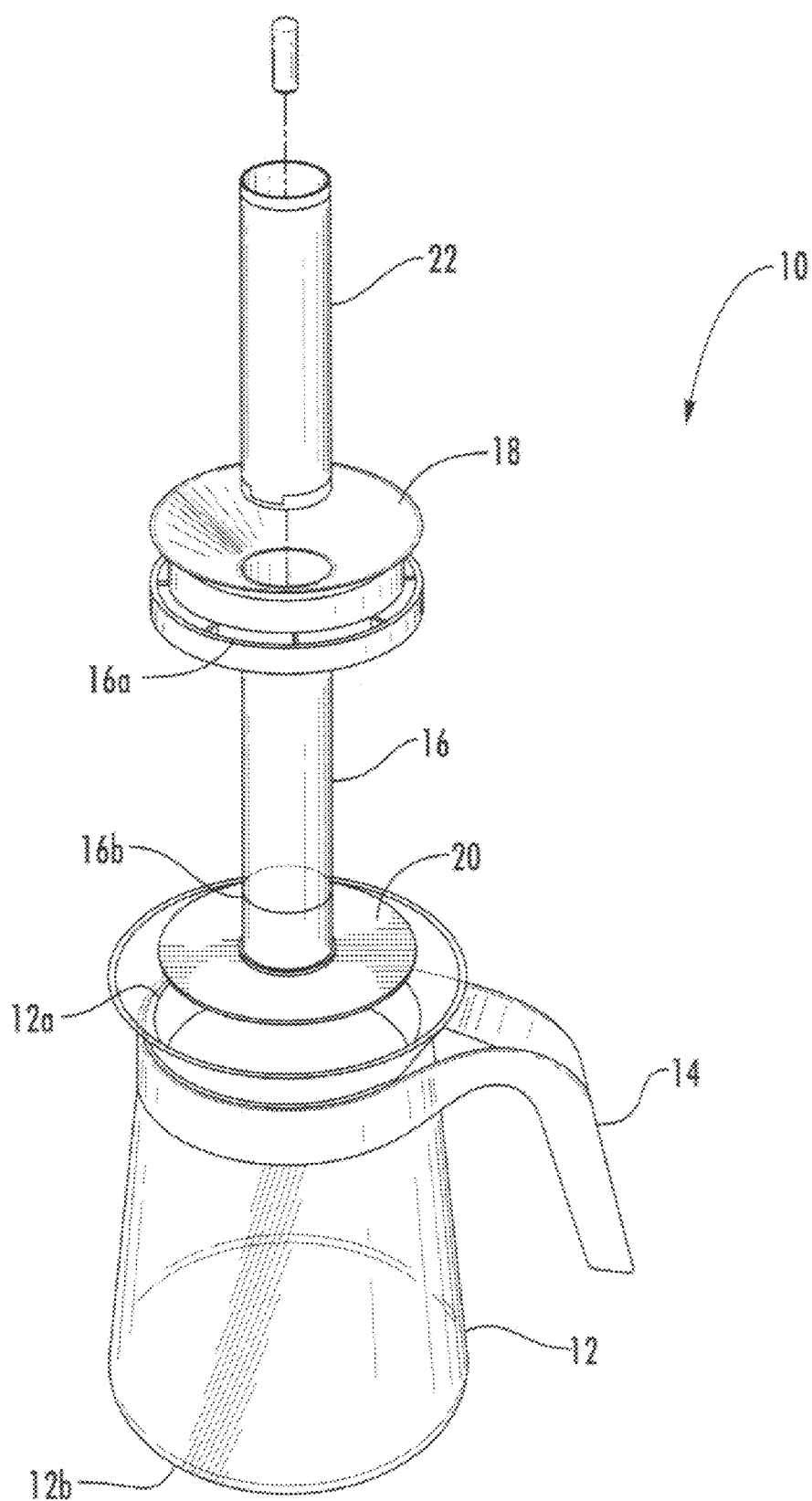
FIG. 1 is an exploded perspective view of an induction heating apparatus in accordance with the present invention; and, FIG. 2 is a perspective view of an assembled induction heating apparatus in accordance with the present invention.

Turning to FIG. 1, an exploded perspective view of the induction heating apparatus of the present invention is provided. The apparatus 10 includes a vessel 12 with an open top 12a connected to an interior of the vessel and a closed bottom 12b. A handle 14 is mounted on the exterior of the vessel. The apparatus 10 includes a removable subassembly comprising a filter column 16 having an upper end 16a and a lower end 16b, a cap 18 fixed to the upper end of the column, and an induction plate 20 preferably fixed to a lower end of the column. A filter basket or an infuser 22 for receiving tea leaves for brewing, for example, can be positioned within the interior of the filter column 16.

When the apparatus is in use, the closed bottom 12b of the vessel 12 sits or rests on an induction base 24. The induction base 24 of the present invention is preferably small and portable; however, a suitable induction base may also include any other induction heating device, such as an induction stove or range top. In addition, the induction base 24 can include sensors to detect temperature and/or boiling action of the liquid within the vessel, in order to maintain a desired temperature, or turn off the magnetic field when the desired temperature level is reached.

Figure 2:
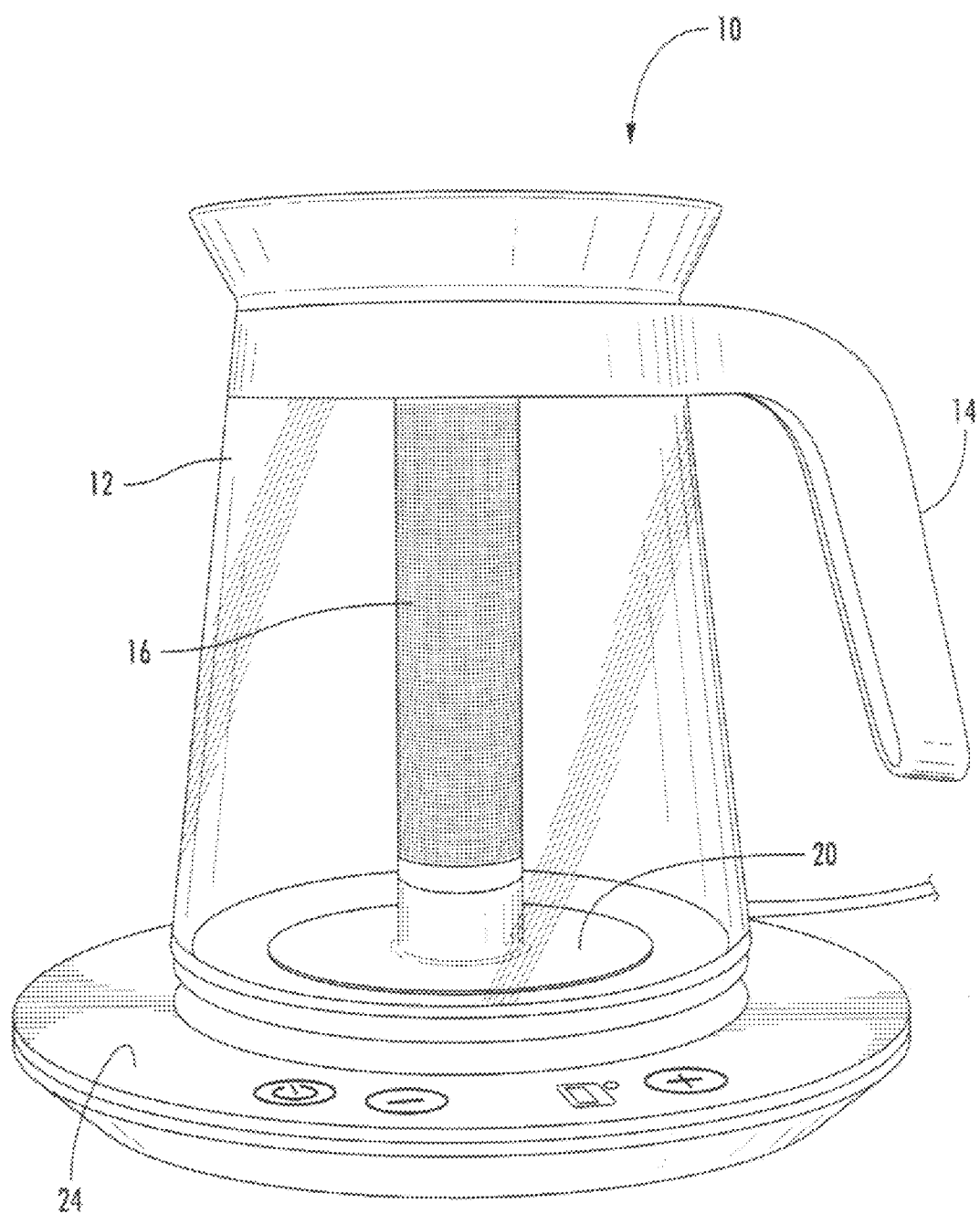

As shown in FIGS. 1 and 2, the vessel 12 can be any suitable shape, generally having a narrower open top 12*a* opening to an interior of the vessel, and a wider closed bottom 12*b*. Preferably, the vessel 12 has a kettle or teapot shape, including a spout for pouring liquid from the vessel, and is constructed of any suitable material, such as glass, non-ferrous metals including copper and aluminum, stainless steel, nickel alloys, plastic or ceramic. Preferably, the vessel 12 is constructed of a clear material, such as glass, not only for aesthetic and design reasons, but also so the user can see inside the vessel. Glass is also lower maintenance and does not tend to absorb odors like some other materials. In addition, the vessel 12 includes a handle 14 of any standard shape or design and generally positioned on the side of the vessel in a useful and aesthetically-pleasing manner.

The apparatus 10 of the present invention includes a removable subassembly comprised of a filter column 16 having an upper end 16*a* and a lower end 16*b*, a cap 18 and an induction plate 20. The filter column 16 has a generally cylindrical shape, preferably a column or tube shape, with an open interior for receiving a filtering apparatus, such as a basket or infuser 22. The filter column 16 has a diameter smaller than the top opening 12*a* of the vessel 12 so that the filter column can be inserted into and removed from the interior of the vessel. The cap 18, which can be attached to the upper end 16*a* of the filter column by any suitable attachment means, is preferably attached by insertion onto the upper end of the filter column 16. The cap 18 can be any desired shape, but is preferably designed having a diameter to fit snugly within the top opening 12*a* of the vessel 12 when the filter column 16 is placed within the interior of the vessel. Preferably, the cap 18 has a concave shape, such that when it is seated within the top opening 12*a* of the vessel, the cap forms a funnel to facilitate pouring liquid into the vessel. The filter column 16 and cap 18 are constructed from any suitable, durable metal, preferably stainless steel.

The heat induction apparatus 10 of the present invention also includes an induction plate 20. The induction plate 20 can be any suitable geometric shape to correspond with the shape of the vessel, including square or rectangular. In addition, the induction plate 20 may have a smooth or patterned surface. Preferably, the induction plate 20 has a substantially flat, circular or disc shape, which corresponds with the shape of most tea and coffee pots and kettles. The induction plate 20 may be constructed from any ferrous material, such as iron or stainless steel, substantially suitable to receiving magnetic fields created by the induction base 24. In addition, the induction plate 20 may be constructed from a single layer of material or may be a laminated construction of multiple materials. Preferably, the induction plate is thin, with a thickness ranging from 1.0 to 10.0 mm. The thin induction plate 20 of the present invention will reach the desired temperatures substantially quicker and heat the surrounding liquid much faster than a standard thick metal induction device.

Figure 3:
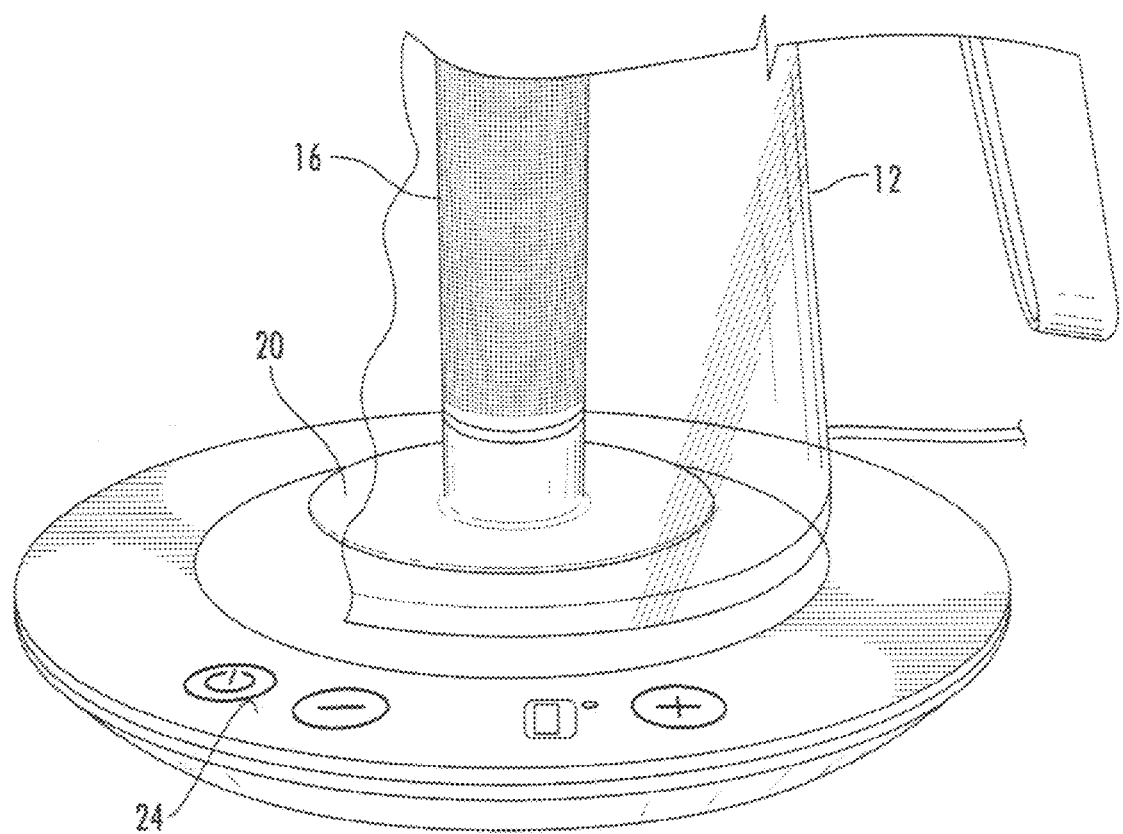
FIG. 3 is a close-up view of the induction plate and induction base in accordance with the present invention.

The induction plate 20 is fixedly connected by any suitable connecting means to the lower end 16*b* of the filter column 16. Preferably, the induction plate 20 is connected to the filter column simply by insertion into the lower end 16*b* of the column. Alternatively, the induction plate 20 can be held in place on the bottom or sides of the vessel 12, or separately suspended from the top of the vessel apart from the filter column 16. As shown in FIG. 3, regardless where the induction plate 20 is positioned within the vessel 12, it should be in a suspended or "floating" position, such that it is surrounded by the liquid within the vessel and not in direct contact with or attached to the sides or bottom of the vessel. The induction plate 20 should also be positioned proximate to the induction base 24 so that the plate can be heated by the induction base. Therefore, in a preferred embodiment, if the induction plate 20 is attached to the lower end 16*b* of the filter column 16, when the filter column assembly is placed within the interior of the vessel 12, and the cap 18 seated within the top opening 12*a* of the vessel, the induction plate is suspended above the bottom of the vessel. Preferably, the induction plate 20 is positioned between 1.0 mm to 10 mm above the induction base 24. One skilled in the art will appreciate that the gap between the induction plate 20 and the induction base 24 will depend on the power of the magnetic field created between them. Positioning the induction plate 20 in this manner permits the liquid within the vessel to surround the induction plate, resulting in quicker and more efficient heating of the liquid within the vessel 12, preferably to the boiling point of the liquid. In addition, location of the induction plate 20 within the vessel provides a level of safety because the user cannot come in contact with the induction plate while it is in use.

The induction heating apparatus 10 of the present invention provides a method for heating a liquid using induction heating. When an embodiment of the induction heating apparatus 10 of the present invention is in use, the vessel 12 is filled with the desired amount of liquid, generally water. The user would then insert the subassembly filter column 16, which includes the attached cap 18 and induction plate 20, through the top opening 12*a* of the vessel 12 until the cap rests in its fully-seated position within the top opening of the vessel. The user would then place the assembled apparatus 10 onto the induction base 24, or another induction heating device, such as a stove top. The user would then activate the induction base 24, creating a magnetic field, which in turn creates the eddy currents in the induction plate 20, thereby heating it. The heated induction plate 20 in turn heats the surrounding water in the vessel 10. The user can see when the water begins to boil through the glass vessel. Once the liquid has reached its boiling point, the vessel 12 can be removed from the induction base 24, and if brewing tea is desired, tea leaves can be added to the basket or infuser 22, which is then inserted into the filter column 16 for the desired brew time.

While the present invention has been described in relation to brewing tea or possibly coffee, it is conceivable that the present invention may also be useful for creating a humidifier, for use as a medical or facial steam apparatus, for use as a steam fabric wrinkle remover, and wherever else the benefits of induction heating of liquid can be used. It would be apparent to one skilled in the art that certain modifications to the present apparatus may he required to achieve one of these alternative embodiments. For example, perforations may he desired in the cap 18 to permit the escape of steam in a regulated manner.

The foregoing also describes only some embodiments of the present invention and modifications, obvious to those skilled in the art can be made thereto without departing from the present invention.

It should, therefore, be emphasized that the above-described embodiments of the present invention, particularly, any "preferred" embodiments, are possible examples of implementations merely set forth for a clear understanding of the principles for the invention. Many variations and modifications may be made to the above-described embodiment(s)

of the invention without substantially departing from the spirit and principles of the invention. All such modifications are intended to be included herein within the scope of this disclosure and the present invention, and protected by the following claims.

What is claimed is:

1. An induction heating apparatus comprising:
    a vessel having a volume with a top opening;
    a cap seated in the top opening;
    a filter column suspended from the cap and positioned within the volume;
    an infuser disposed within the filter column;
    an induction plate suspended from the bottom side of a lower end of the filter column; and,
    an induction base.

2. The induction heating apparatus of claim 1, wherein the vessel is formed from a non-ferrous material.

3. The induction heating apparatus of claim 1, wherein the vessel is formed from glass.

4. The induction heating apparatus of claim 1, wherein the induction plate is formed from a substantially ferrous material suitable for receiving a magnetic field from the induction base.

5. The induction heating apparatus of claim 1, wherein the induction plate is surrounded by a liquid received within the vessel.

6. The induction heating apparatus of claim 1, wherein the induction plate is positioned proximate to the induction base.

7. The induction heating apparatus of claim 1, wherein the filter column is centrally positioned within the volume.

8. The induction heating apparatus of claim 6, wherein the induction plate is positioned about 1.0 mm to 10.0 mm above the induction base.

9. An induction heated kettle for heating a liquid, the kettle comprising:
    a vessel having a volume for receiving a liquid and a top opening;
    a removable subassembly comprising:
        a cap seated in the top opening of the vessel, and forming a funnel to facilitate the pouring of liquid into the vessel
        a filter column suspended from the cap; and
        an induction plate suspended from the filter column; and,
    an induction base.

10. The kettle of claim 9, wherein the induction plate is formed from a substantially ferrous material suitable for receiving a magnetic field from the induction base.

11. The kettle of claim 9, wherein the induction plate is suspended within the volume.

12. The kettle of claim 9, wherein, upon completely filling the vessel with a liquid, the induction plate is surrounded on all sides by the liquid received within the vessel.

13. The kettle of claim 9, wherein the induction plate is positioned proximate to the induction base.

14. The kettle of claim 9, wherein the filter column is centrally positioned within the volume.

15. The kettle of claim 9, wherein the induction plate is connected to a lower end of the filter column.

16. The kettle of claim 9, wherein the cap is connected to a top end of the filter column.

17. The induction heating apparatus of claim 9, wherein the vessel is formed from glass.

18. The induction heating apparatus of claim 9, wherein the vessel is formed from a non-ferrous material.

19. The induction heating apparatus of claim 9, wherein the induction plate is positioned about 1.0 mm to 10.0 mm above the induction base.

20. A method for induction heating of a liquid, the method comprising the steps of:
    providing an induction heating apparatus, the apparatus comprising:
        i. a vessel having a volume;
        ii. a filter column positioned within the volume;
        iii. an infuser disposed within the filter column;
        iv. an induction plate fixedly connected to a lower end of the filter column; and,
        iii. an induction base;
    applying energy to the induction base;
    generating heat through the induction plate; and, heating the liquid to a desired temperature.

21. The method for induction heating of the liquid of claim 20, further including the step of centrally positioning the filter column within the volume.

* * * * *